United States Patent
Hyun (10) Patent No.: US 7,440,783 B2
(45) Date of Patent: Oct. 21, 2008

(54) DUAL AXIS HINGE APPARATUS FOR PORTABLE TERMINAL

(75) Inventor: Seung-Hee Hyun, Gyeongsnagbuk-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 412 days.

(21) Appl. No.: 11/194,572

(22) Filed: Aug. 2, 2005

(65) Prior Publication Data

US 2006/0037175 A1 Feb. 23, 2006

(30) Foreign Application Priority Data

Aug. 17, 2004 (KR) .............. 10-2004-0064787
May 6, 2005 (KR) .............. 10-2005-0037944

(51) Int. Cl.
*H04M 1/00* (2006.01)

(52) U.S. Cl. .............. 455/575.3; 455/90.3; 455/575.1; 455/550.1; 455/575.4; 455/575.8; 379/433.11; 379/433.13; 361/681

(58) Field of Classification Search .............. 455/90.3, 455/575.3, 575.1, 575.8, 550.1, 556.1, 575.4; 379/433.11, 433.13; 361/681
See application file for complete search history.

(56) References Cited

U.S. PATENT DOCUMENTS

| | | | | |
|---|---|---|---|---|
| 6,256,481 B1 * | 7/2001 | Jeong et al. | .............. | 455/575.3 |
| 6,745,436 B2 * | 6/2004 | Kim | .............. | 16/330 |
| 6,941,618 B2 * | 9/2005 | Kim | .............. | 16/337 |
| 6,980,424 B2 * | 12/2005 | Kim et al. | .............. | 361/683 |
| 7,006,853 B2 * | 2/2006 | Kang et al. | .............. | 455/575.3 |
| 7,117,564 B2 * | 10/2006 | Jeong | .............. | 16/334 |
| 7,146,197 B2 * | 12/2006 | Kang et al. | .............. | 455/575.1 |
| 7,184,805 B2 * | 2/2007 | Cho et al. | .............. | 455/575.4 |
| 7,193,653 B2 * | 3/2007 | Lee | .............. | 348/373 |
| 7,228,158 B2 * | 6/2007 | Lee et al. | .............. | 455/575.3 |
| 7,229,186 B2 * | 6/2007 | Hwang et al. | .............. | 362/109 |
| 7,242,975 B2 * | 7/2007 | Bae et al. | .............. | 455/575.3 |
| 7,266,864 B2 * | 9/2007 | Kim | .............. | 16/367 |
| 7,272,423 B2 * | 9/2007 | Satoh et al. | .............. | 455/575.3 |
| 7,295,428 B2 * | 11/2007 | Lee et al. | .............. | 361/679 |
| 7,299,526 B2 * | 11/2007 | Kim | .............. | 16/367 |

(Continued)

FOREIGN PATENT DOCUMENTS

CN 1414767 A 4/2003

(Continued)

*Primary Examiner*—Marceau Milord
(74) *Attorney, Agent, or Firm*—Roylance, Abrams, Berdo & Goodman L.L.P.

(57) ABSTRACT

A dual hinge apparatus for a portable terminal provides a pair of hinge axes perpendicular to each other and connects first and second housings that form the portable terminal to each other such that they can rotate relative to the first and second hinge axes, respectively. The hinge apparatus includes a fixed housing, a rotating housing coupled opposite to the fixed housing to rotate relative to the second hinge axis, and a hinge housing coupled to a side surface of the rotating housing to provide the first hinge axis. Such a hinge apparatus couples the pair of housings to each other such that they can be positioned laterally side by side with each other. Thus, a display unit can lie transversely and lengthwise, which is convenient for using multimedia services. Using the disclosed hinge apparatus, it is easy to construct various types of information terminals.

30 Claims, 12 Drawing Sheets

U.S. PATENT DOCUMENTS

2003/0040288 A1  2/2003  Kang et al.
2004/0049884 A1  3/2004  Kim

FOREIGN PATENT DOCUMENTS

| CN | 1496179 A | 5/2004 |
| KR | 20-0317088 | 6/2003 |
| WO | WO 03/100999 A1 | 12/2003 |

* cited by examiner

DUAL AXIS HINGE APPARATUS FOR PORTABLE TERMINAL

CROSS-REFERENCE TO RELATED APPLICATIONS

This application claims the benefit under 35 U.S.C. § 119(a) of Korean Patent Application Serial No. 2004-64787, entitled "Dual Axis Hinge Apparatus for Portable Terminal," filed with the Korean Intellectual Property Office on Aug. 17, 2004, and Korean Patent Application Serial No. 2005-37944, also entitled "Dual Axis Hinge Apparatus for Portable Terminal," filed with the Korean Intellectual Property Office on May 6, 2005. The entire disclosure of both of these applications is hereby incorporated by reference.

BACKGROUND OF THE INVENTION

1. Field of the Invention

The present invention relates to a portable terminal, such as a cellular phone, a Personal Digital Assistant (PDA), a Hand Held Phone (HHP), a Palm PC, or the like. More particularly, the present invention relates to a hinge apparatus for connecting a pair of housings to each other in such a manner that the housings can be pivoted relative to a pair of hinge axes, respectively.

2. Description of the Related Art

In general, a portable terminal is an apparatus which a user can carry to perform wireless communication with other parties. There are several types of portable terminals, such as bar-type terminals, flip-type terminals, and folder type terminals. A bar-type terminal has a single bar-shaped housing, and a flip-type terminal has a flip or cover which is pivotally coupled to a bar-shaped housing by a hinge unit. A folder-type terminal has a folder which is pivotally connected to a single bar-shaped housing by a hinge unit. The folder can be folded toward or unfolded from the housing.

Portable terminals may be also classified as neck wearable-type terminals, wrist wearable-type terminals, and so forth, according to the position on a user's body where the terminal is worn. A neck wearable-type terminal is a terminal which a user wears on his or her neck using a string, and a wrist wearable-type terminal is a terminal which a user wears on his or her wrist.

Furthermore, portable terminals may be classified into a rotation-type terminal or a sliding-type terminal, according to the way the terminal is opened and closed. In a rotation-type terminal, two housings facing each other are pivotally coupled to each other such that one of them rotates to open or closed relative to the other. In the sliding-type terminals, two housings are coupled to each other such that one of them longitudinally slides to open or close relative to the other. Those skilled in the art readily understand these various types of portable terminals.

Each of the above-mentioned conventional portable terminals necessarily includes an antenna unit, a data input unit, a data output unit, and a data transmission/reception unit. The data input unit is usually a key array which enables a user to input data using the fingers, but a touchpad, a touch screen or a speech recognition unit may also be used as a data input unit. The data output unit is ordinarily a well-known display unit such as an LCD.

The key array used for inputting data has an array of numerous keys. The keys include numeric keys, character keys, send keys, end keys, function keys, and the like. In general, 15 to 20 keys are arranged in position on an upper surface of a portable terminal. Of course, the keys are exposed to a user so that he or she can input desired data using his or her fingers.

The portable terminal may also further include a camera lens so as to provide image communication or to take photographs of a subject.

In recent years, the user's taste with respect to the type of terminal has diversified, and user's have increased their desire for receiving information on portable terminals. Convention portable terminals do not satisfy these increased desires, however. In fact, it is very inconvenient to communicate in an Internet or multimedia environment using conventional terminals. The inconvenience is particularly noticeable when a user attempts to view Video On Demand (VOD), watch movies, play games or view television. The inconvenience is caused by the fact that most display units of conventional terminals have a rectangular shape and are located lengthwise. Since the visible picture is small, and the unit is arranged lengthwise, the user perceives that the picture is narrow.

Accordingly, there is a need for a portable terminal that has an improved display output unit.

SUMMARY OF THE INVENTION

An aspect of the present invention is to solve at least the above problems and/or disadvantages and to provide at least the advantages described below. Accordingly, an aspect of the present invention is to provide a dual axis hinge apparatus for a portable terminal that enables a display unit of the portable terminal to be used like a wide-screen, thereby facilitating easy use of multimedia services such as movies, games, television and the like.

A further aspect of the present invention is to provide a dual axis hinge apparatus for a portable terminal that enables the portable terminal to be used in diverse ways by positioning a pair of housings laterally side by side with each other.

In accordance with these aspects of the present invention, a portable terminal has first and second housings that are connected by a dual axis hinge. The dual axis hinge has a first hinge axis and a second hinge axis that extends perpendicularly to the first hinge axis, and connects the first and second housings to each other so that they can rotate relative to the first and second hinge axes, respectively. The hinge comprises a fixed housing, a rotating housing coupled opposite to the fixed housing to rotate relative to the second hinge axis, and a hinge housing coupled to a side surface of the rotating housing to provide the first hinge axis.

BRIEF DESCRIPTION OF THE DRAWINGS

The above and other objects, features, and advantages of certain embodiments of the present invention will be more apparent from the following description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
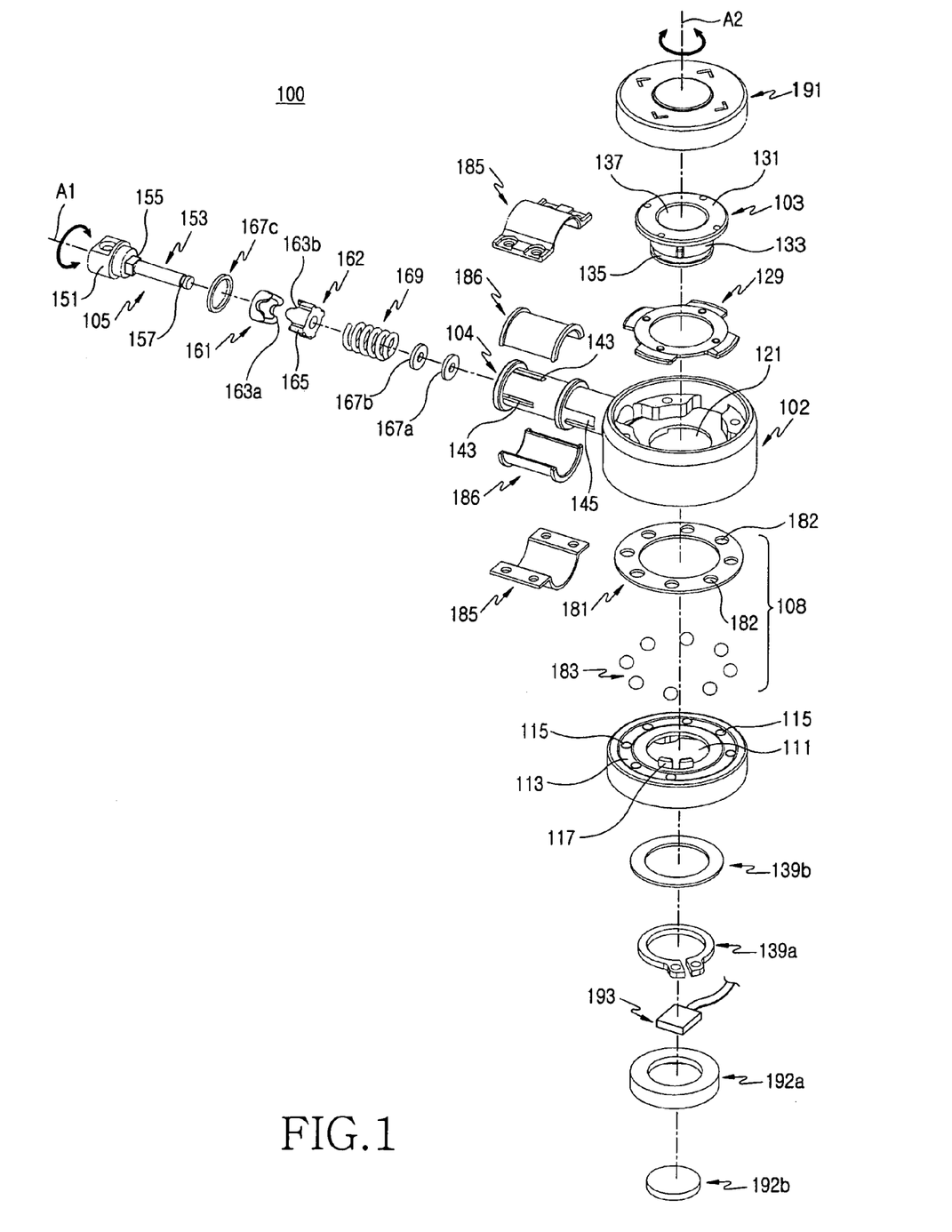
FIG. 1 is an exploded perspective view of a dual axis hinge apparatus for a portable terminal in accordance with an embodiment of the present invention.
Figure 2:
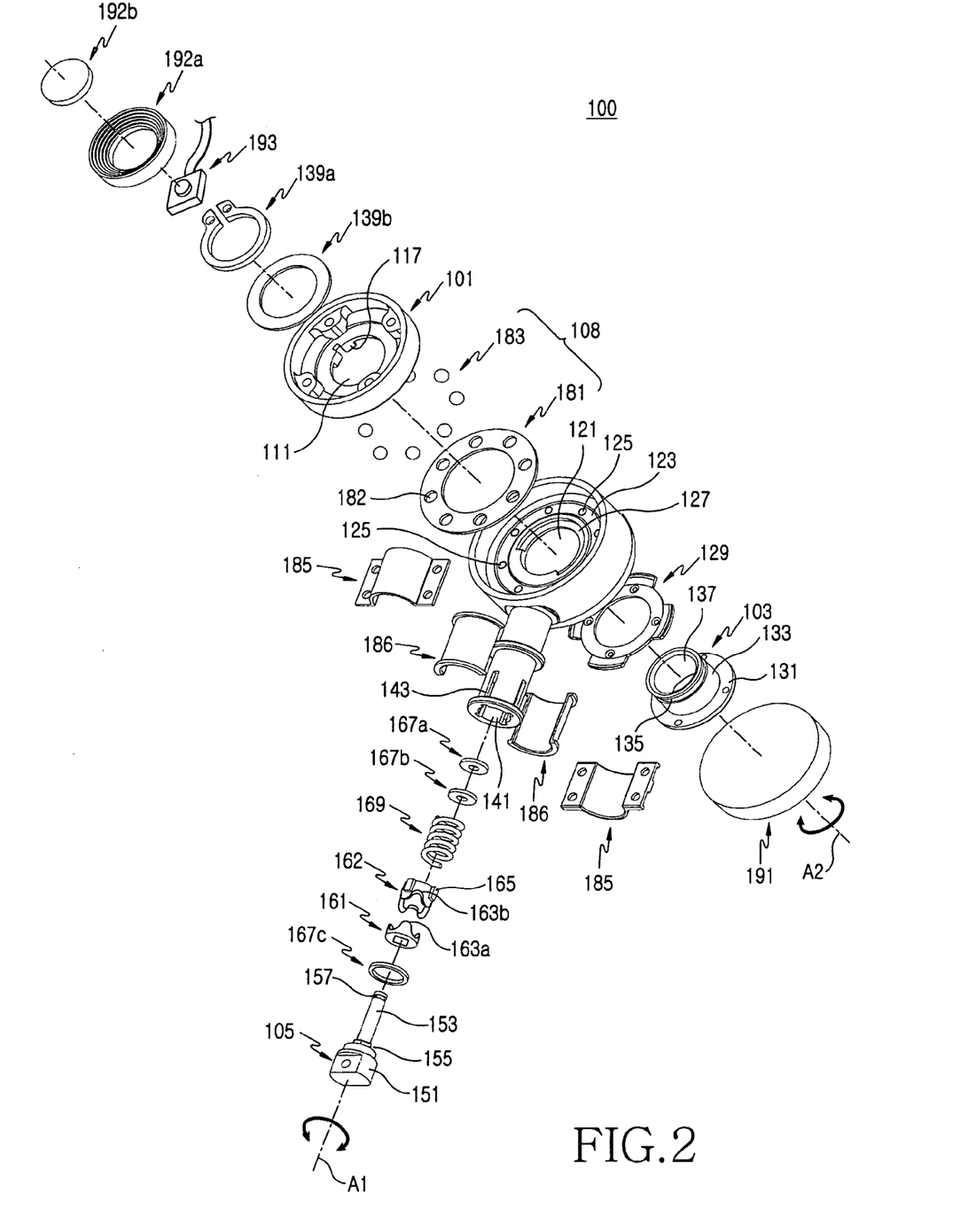
FIG. 2 is an exploded perspective view of the dual axis hinge apparatus in FIG. 1 seen from another direction.
Figure 3:
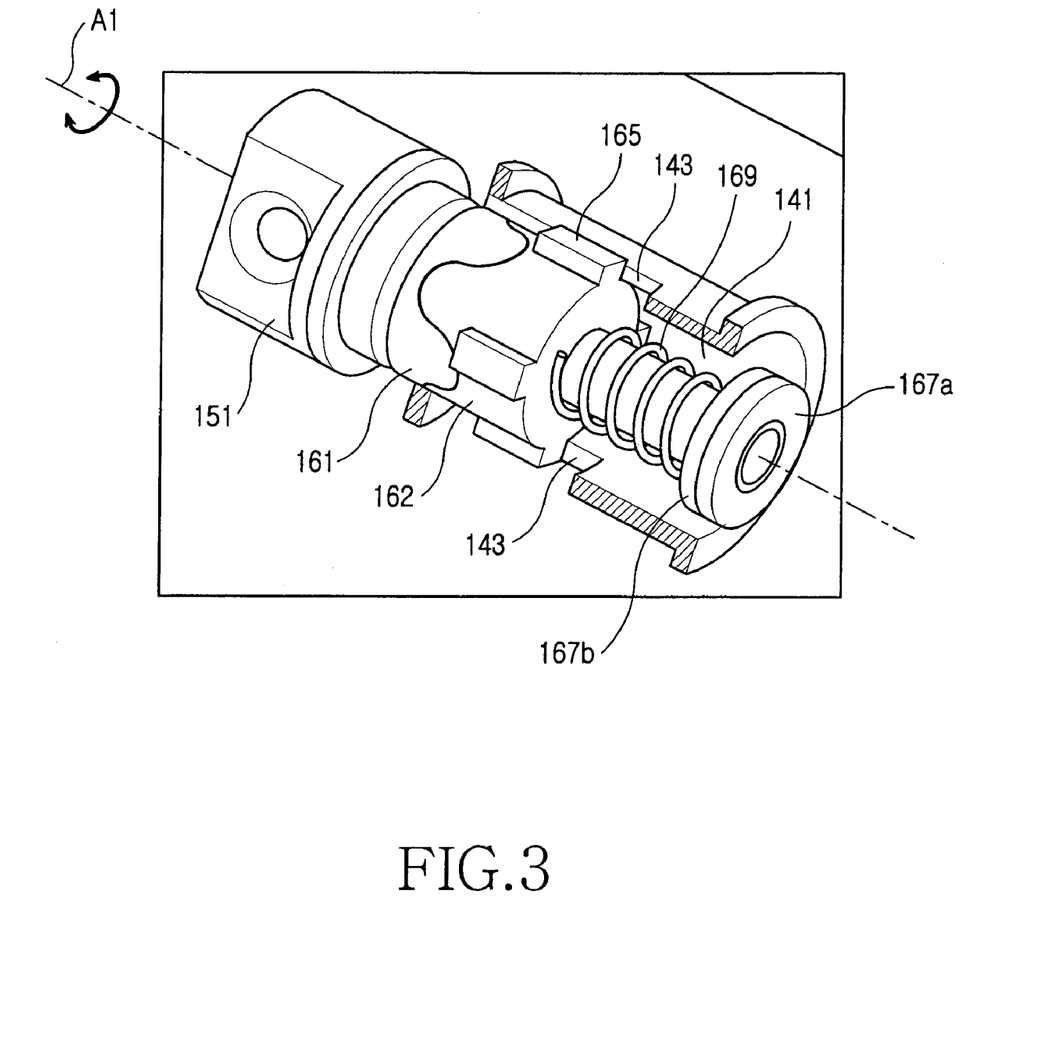
FIG. 3 is a partial cutaway perspective view showing the inner construction of a hinge housing of the dual axis hinge apparatus in FIG. 1.

As shown in FIGS. 1 to 3, a dual axis hinge apparatus 100 for a portable terminal in accordance with an embodiment of the present invention includes a fixed housing 101, a rotating housing 102, and a hinge housing 104. The hinge apparatus provides a first hinge axis A1 that extends in a longitudinal direction of the hinge housing 104 and a second hinge axis A2 that extends perpendicularly to the first hinge axis A1.

The fixed housing 101 has a cylindrical shape and may be formed integrally with one of the two housings that form a portable terminal. The fixed housing 101 has a through hole 111 formed in the direction of the second hinge axis A2. The upper surface of the fixed housing 101 has a first rotary groove 113 that extends in a circumferential direction and neighbors the through hole 111. The first rotary groove 113 has a plurality of stopper holes 115 that are arranged at equiangular distances around the groove. A stopper protrusion 117 protrudes from the fixed housing 101 in the direction of the second hinge axis A2 and is located between the through hole 111 and the rotary groove 113. The rotating housing 102 is coupled to the fixed housing 101 and rotates around the second hinge axis A2. When the rotating housing 102 rotates, the stopper protrusion 117 restricts the rotation range of the rotating housing 102.

A camera element 193 is received within the fixed housing 101 and is protected by a camera cover 192a, an exposure window 192b and the like.

The rotating housing 102 is rotatably coupled to the fixed housing 101 while facing an upper surface of the fixed housing 101 so that it can rotate around the second hinge axis A2. The rotating housing 102 is cylindrical, and the hinge housing 104 extends from the side of the rotating housing 102 in the direction of the first hinge axis A1. The rotating housing 102 has a second rotary groove 123 that faces the first rotary groove 113, and a plurality of stopper holes 125 are arranged at equiangular distances around the second rotary groove 123. The rotating housing 102 also has a through hole 121 communicating with the fixed housing 101 and positioned on the second axis A2. A guide groove 127 is formed between the through hole 121 and the second rotary groove 123 and extends over a selected angular range in a circumferential direction. When the fixed housing 101 is coupled to the rotating housing 102, the stopper protrusion 117 is located within the guide groove 127. Thus, the rotation range of the rotating housing 102 is restricted by the stopper protrusion 117 and the guide groove 127. In this exemplary embodiment, the guide groove 127 restricts the rotation range of the rotating housing 102 to 180 degrees or less. For example, if the stopper protrusion 117 is extends 20 degrees around the second hinge axis A2, the guide groove 127 extends 200 degrees, so that the rotation range of the rotating housing 102 is restricted to 180 degrees.

A navigation key 191 may be provided on an upper portion of the rotating housing 102. The navigation key 191 operates as a function key used for menu navigation, searching, viewing multimedia such as moving pictures, and so forth.

The rotating housing 102 is rotatably coupled to the fixed housing 101 by a coupling shaft 103 that passes through the through holes 111 and 121. The coupling shaft 103 comprises a coupling cylinder 133 which passes through the through holes 111 and 121 from one side of the rotating housing 102, and a supporting plate 131 which is formed at one end of the coupling cylinder 133 and is supported on the same side of the rotating housing 102. A locking groove 135 is formed on an outer peripheral surface of the other end of the coupling cylinder 133 along a circumferential direction, and a C-ring 139a is engaged with the locking groove 135. The C-ring 139a is supported on one surface of the fixed housing 101, and a washer 139b may be interposed between the one surface of the fixed housing 101 and the C-ring 139a. The coupling shaft 103 may be formed with a through hole 137 extending from the supporting plate 131 and passing through the end of the coupling cylinder 133. The through hole 137 of the coupling shaft 103 connects the interiors of the fixed housing 101 and the rotating housing 102 with each other.

To keep the fixed housing 101 and the rotating housing 102 in close contact with each other, a plate spring 129 may be interposed between the supporting plate 131 of the coupling shaft 103 and the rotating housing 102. The plate spring 129 provides a resilient force acting in a direction away from the one surface of the rotating housing 102 to ensure close contact between the fixed housing 101 and the rotating housing 102.

A ball assembly 108 may be interposed between the fixed housing 101 and the rotating housing 102. That is, the fixed housing 101 and the rotating housing 102 do not come into contact with each other, but may be constructed such that they are held close to each other by the resilient force from the plate spring 129.

The ball assembly 108 comprises a washer plate 181 which is positioned between the first and second rotary grooves 113 and 123, and a plurality of preferably metallic balls 183 which are arranged at equal circumferential distances on the washer plate 181. The washer plate 181 has rotary holes 182 where the balls 183 are located.

If the first and second rotary grooves 113 and 123 did not have stopper holes 115 and 125, the ball assembly 108 would only facilitate the rotation of the rotating housing 102. In this exemplary embodiment, however, the stopper holes 115 and 125 are formed at equiangular distances to engage the balls 183, so the rotation of the rotating housing 102 can be stopped at equiangular intervals.

In this respect, it is obvious that the number of the stopper holes 115, 125 must be equal to or more than the number of balls 183 so as to appropriately engage the balls 183 with the stopper holes 115 and 125. Also, when there are more stopper holes 115, 125 than balls 183, the number of stopper holes 115, 125 is preferably a multiple of the number of balls 183 so that all of the metallic balls 183 can be simultaneously located in the stopper holes 115 and 125.

When the balls 183 deviate from the stopper holes 115 and 125, the fixed housing 101 and the rotating housing 102 are apart from each other to a certain extent, which is enabled by the plate spring 129. That is, when the metallic balls 183 deviate from the stopper holes 115 and 125, the plate spring 129 is elastically deformed to separate the fixed housing 101 and the rotating housing 102 from each other, but continues to apply a resilient force. Consequently, the rotating housing 102 can linearly move toward or away from the fixed housing 101, and the range of the linear movement is determined by the sizes of the stopper holes 115 and 125 and the balls 183. That is, the deeper the depth of the stopper holes 115 and 125, the larger the linear movement range of the rotating housing 102 is. However, since the stopper holes 115 and 125 and the balls 183 are provided to stop the rotation of the rotating housing 102 at equiangular intervals, it is advantageous to minimize the linear movement range of the rotating housing 102 to provide a stable, secure hinge apparatus 100.

The hinge housing 104 is constructed such that it extends from an outer peripheral surface of the rotating housing 102 in the direction of the first hinge axis A1. An outer peripheral surface of the hinge housing 104 has an opening 145 that communicates with the inside of the rotating housing 102. A hinge hole 141 is located at the end of the hinge housing 104 and extends in the direction of the first hinge axis A1. An inner wall of the hinge hole 141 is formed with at least one guide hole 143 that extends in the direction of the first hinge axis A1.

A locking piece 185 is rotatably coupled to the hinge housing 104. The locking piece 185 is attached to the other housing of the terminal (that is, the housing of the terminal that is not connected to the fixed housing 101). The locking piece 185 comprises a pair of halves which face each other and are coupled to each other. The locking piece 185 surrounds an outer peripheral surface of the hinge housing 104, and rotates relative to the first hinge axis A1 on the outer peripheral surface of the hinge housing 104. A friction piece 186 is further interposed between the locking piece 185 and the outer peripheral surface of the hinge housing 104. The friction piece 186 is preferably made of material capable of providing lubricating action, such as polytetrafluoroethylene.

A hinge shaft 105 is rotatably received in the inside of the hinge housing 104. An end of the hinge shaft 105 is fixed to the other housing of the terminal (that is, the housing of the terminal that the locking piece 185 is attached to).

The hinge shaft 105 comprises a locking body portion 151 which is located at one end of the hinge shaft 105 and is fastened to the other housing of the terminal, and a shaft portion 153 which extends from the locking body portion 151 in the direction of the first hinge axis A1. The hinge shaft 105 also has a fastening protrusion 155 which is formed between the locking body portion 151 and the shaft portion 153, and a locking groove 157 on an outer peripheral surface of an end of the shaft portion 153.

Hinge cams 161 and 162 and a coil spring 169 are coupled on the shaft portion 153 of the hinge shaft 105 to generate a turning force according to the rotational angle of the hinge shaft 105.

The hinge cams 161 and 162 comprises a first hinge cam 161 fixed to the fastening protrusion 155 of the shaft portion 153 and a second hinge cam 162 rotatably coupled to the shaft portion 153. The first and second hinge cams 161 and 162 are formed with ridge-shaped portions 163a and valley-shaped portions 163b which are selectively engaged with each other when they face each other. The outer peripheral surface of the second hinge cam 162 has guide protrusions 165 to engage with the guide holes 143 of the hinge housing 104. Thus, the second hinge cam 162 moves linearly within the hinge hole 141.

The coil spring 169 is coupled on the shaft portion 153 such that it applies a resilient force acting in a direction in which the first and second hinge cams 161 and 162 come in close contact with each other. When the ridge-shaped portions 163a and the valley-shaped portions 163b are not yet engaged with each other, the resilient force of the coil spring 169 advances the second hinge cam 162 in a direction in which it comes in close contact with the first hinge cam 161. Since the ridge-shaped portions 163a and the valley-shaped portions 163b have curved surfaces, the hinge cam 162 rotates toward a direction in which the ridge-shaped portions 163a and the valley-shaped portions 163b are engaged with each other as the second hinge cam 162 advances.

Therefore, the hinge cams 161 and 162 and the coil spring 169 generate the turning force of the hinge shaft 105.

One end of the coil spring is supported against the second hinge cam 162, and the other end is supported against a washer 167b located at the end of the shaft portion 153. An O-ring 167a is coupled to the locking groove 157 provided at the end of the shaft portion 153 to prevent movement of the washer 167b. A washer 167c may be placed between the first hinge cam 161 and the locking body portion 151, if desired.

If the hinge shaft 105 that the hinge cams 161, 162 and the coil spring 169 are coupled to is received in the hinge hole 141, the guide protrusion 165 engages the guide hole 143 and the locking body portion 151 is fastened to the other housing of the terminal. In this way, the assembly of the hinge shaft 105 is completed.

It is noted that in this embodiment, the other housing is fastened to both the locking body portion 151 and the hinge housing 104 (by the locking pieces 185). Since the other housing is attached at two places, the hinge shaft 105 may be mounted in the hinge hole 141 by linearly moving the hinge shaft to couple the guide protrusion 165 of the second hinge cam 162 in the guide hole 143. That is, the two connections restrain the hinge shaft 105 and prevent it from coming out of the hinge hole 141.

However, according to another embodiment, the end of the shaft portion 151 passes through an inner end wall of the hinge hole 141 and protrudes adjacent to the opening 145. An O-ring 167a is fitted into the locking groove 157 formed at the end of the shaft portion 153 to couple the hinge shaft 153 to the hinge housing 102. In this embodiment, it is not necessary to fasten the other housing to the hinge housing 104 with the locking pieces 185, since the O-ring 167a restrains the hinge shaft.

Figure 4:
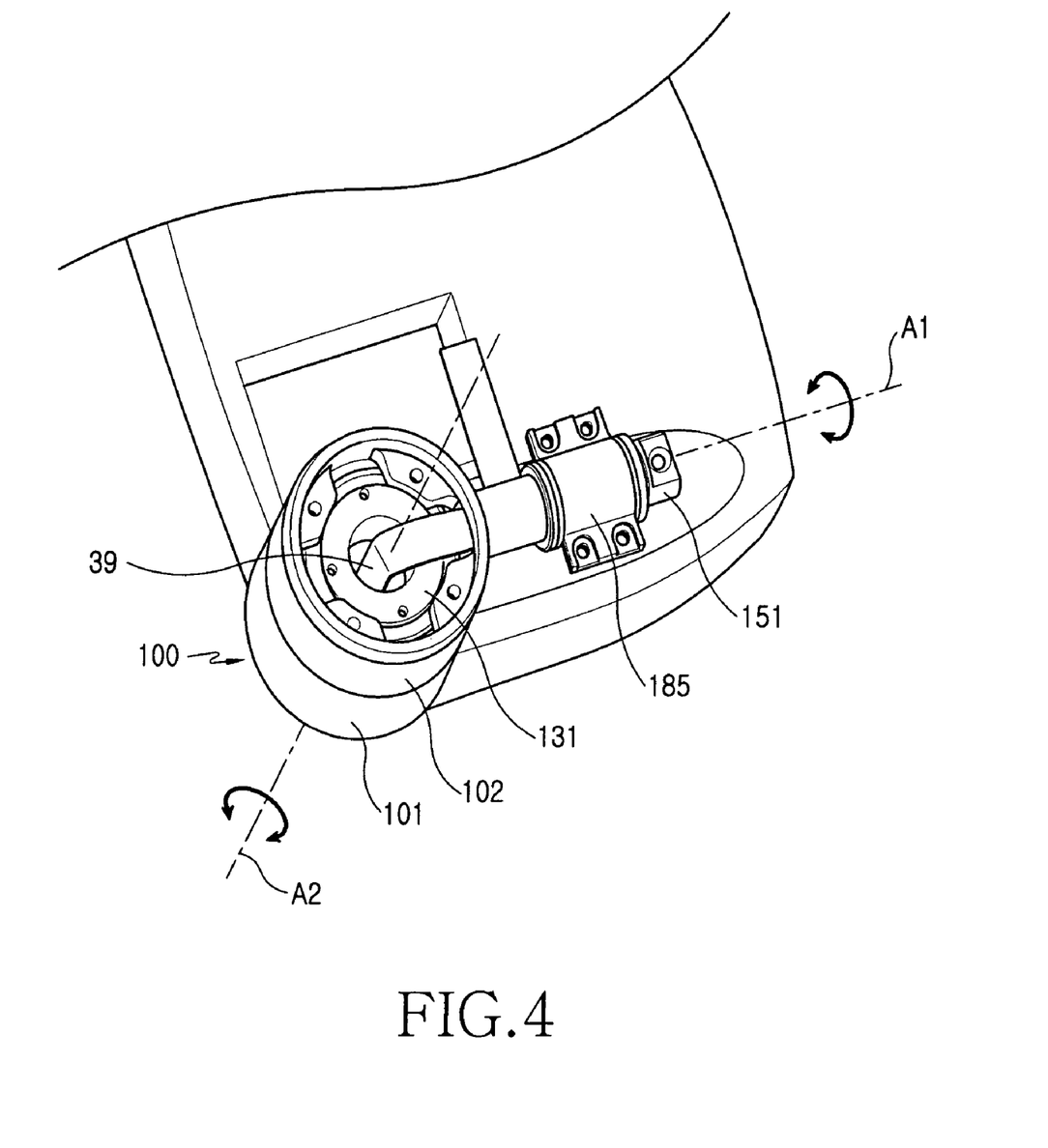
FIG. 4 is a perspective view showing the dual axis hinge apparatus in FIG. 1 coupled to a portable terminal.
Figure 5:
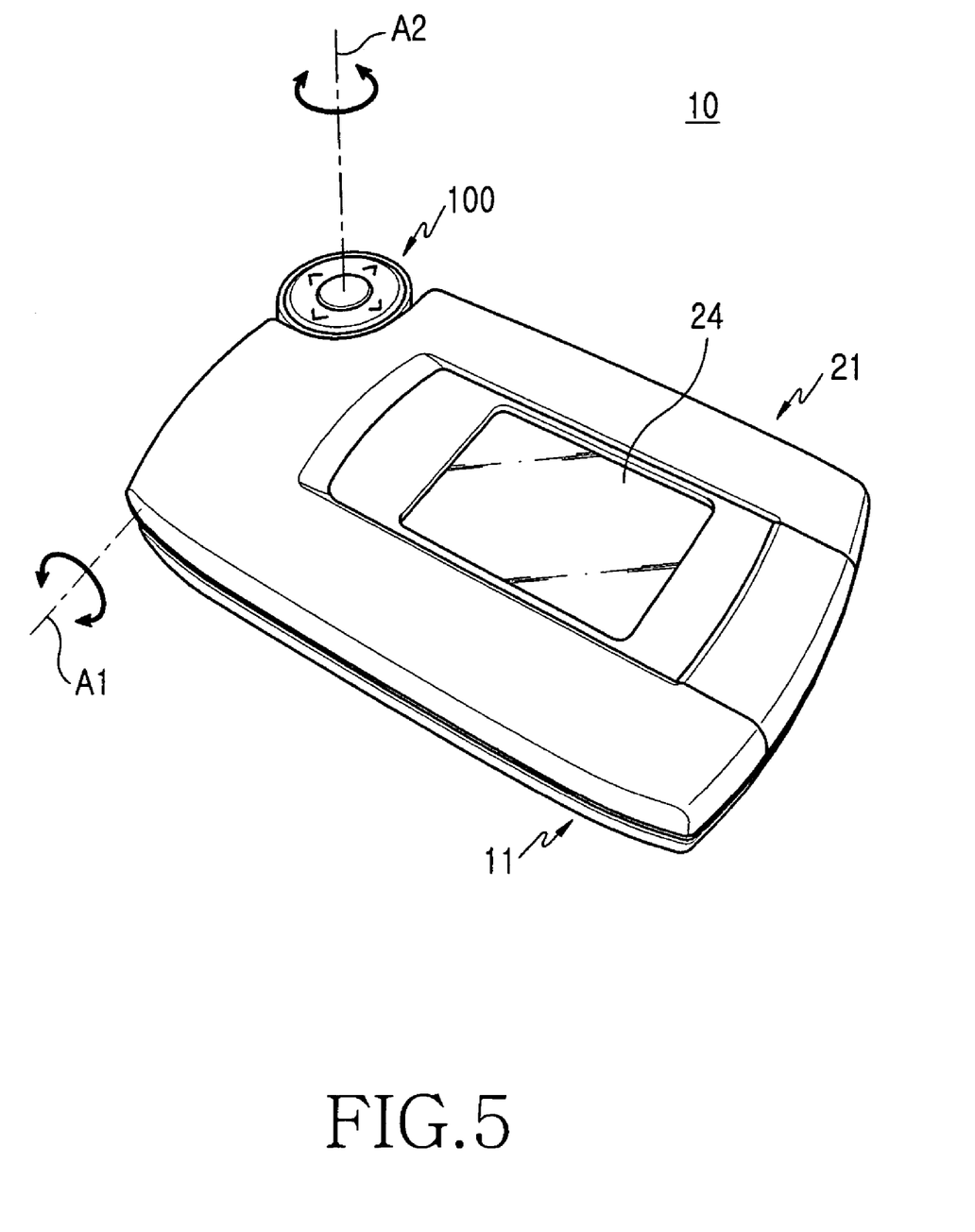
FIG. 5 is a perspective view showing a portable terminal with the dual axis hinge apparatus in FIG. 1.

The hinge apparatus 100 not only connects the pair of terminal housings to each other, but also provides a passageway for a flexible printed circuit 39 (shown in FIG. 4) which electrically connects circuitry devices included within the respective housings to each other. Referring to FIG. 4, the flexible printed circuit 39 extends from the fixed housing 101 into the rotating housing 102 through the through hole 137 of the coupling shaft 103. Within the rotating housing 102, the flexible printed circuit 39 is bent toward and extends into the hinge housing 104, and is finally withdrawn through the opening 145 (FIG. 1) of the hinge housing 104. Since the flexible printed circuit 39 existing within the fixed housing 101 is derived from the terminal housing to which the fixed housing 101 is coupled, the circuitry devices included within the pair of terminal housings are electrically connected to each other.

Hereinafter, a portable terminal 10 with the above-mentioned dual axis hinge apparatus 100 will be described in detail with reference to FIGS. 5 to 8. As shown in the drawings, the portable terminal 10 comprises a pair of housings 11 and 21 which, starting from a state where one of them is folded to face the other, can rotate relative to the first hinge axis A1 in a direction away from each other or rotate relative to the second axis A2 while facing each other.

The fixed housing 101 is fixed to the first housing 11 of the terminal 10. The rotating housing 102 is coupled to the fixed housing 101 in such a manner that it can rotate relative to the second hinge axis A2 while facing the fixed housing 101. The second housing 21 is pivotally coupled to the hinge housing 104. When the second housing 21 rotates relative to the hinge housing 104, the hinge cams 161, 162 and the shaft 105 within the hinge housing 104 impart a turning force to the second housing 21 according to the angle at which the second housing 21 rotates relative to the first hinge axis A1. The fixed housing may be formed integrally with the first housing 11.

The first housing 11 has a keypad 13 with a plurality of keys on its front surface, a transmitter unit 12, and a shunt recess 14. The second housing 21 has a main display unit 23 facing the keypad 13 and a receiver unit 22 on its one surface, and has a small-size display unit 24 on the other surface. The dual axis hinge apparatus 100 is disposed on one side of one end of the terminal 10.

The shunt recess 14 is a depressed portion on the front surface of the first housing 11 and is formed adjacent to the hinge apparatus 100. When the second housing 21 rotates from a position in which it faces the first housing 11 toward a direction away from the first housing 11 relative to the first hinge axis A1, the shunt recess 14 provides space to pivot the end of the second housing 21.

Figure 7:
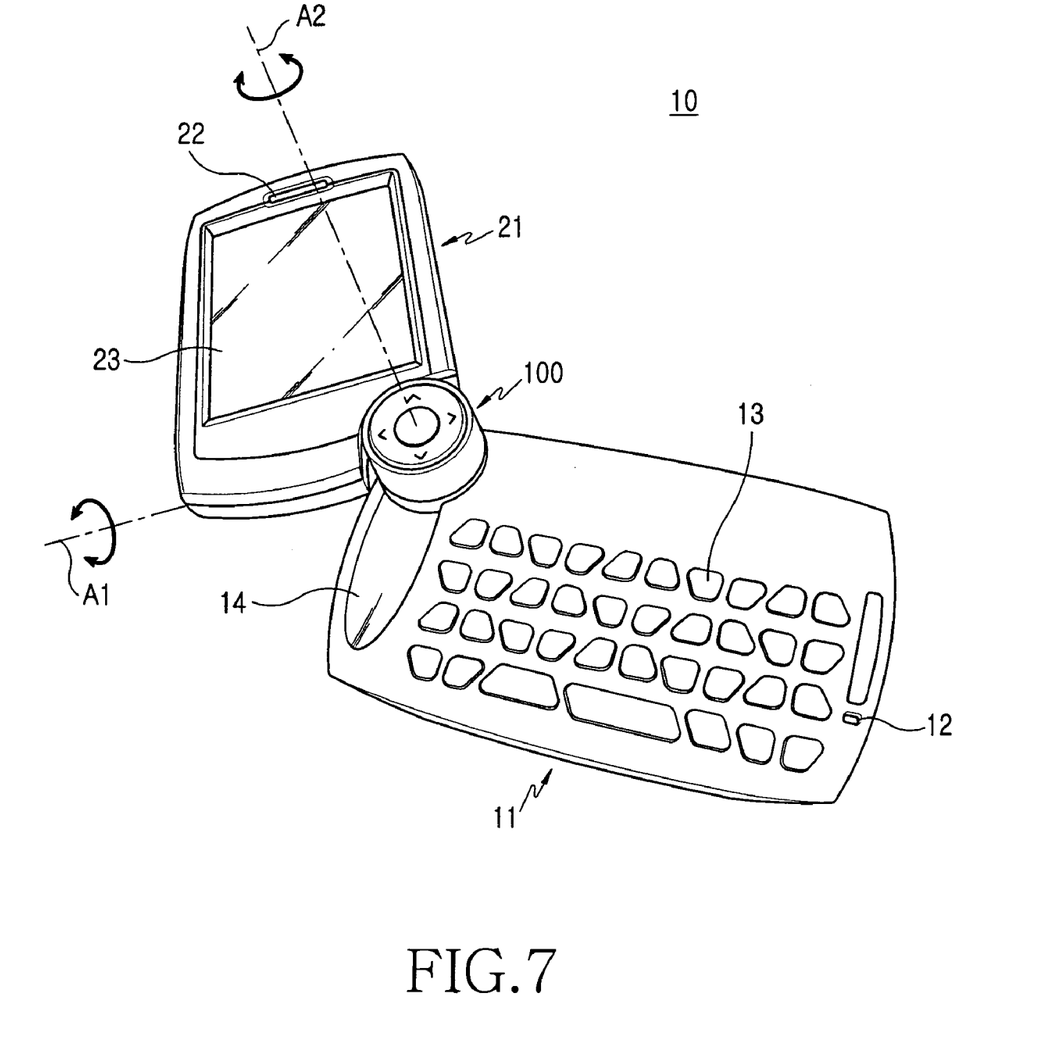
FIG. 7 is a perspective view showing the second housing of the portable terminal in FIG. 5 rotated relative to a second hinge axis of the dual axis hinge apparatus in FIG. 1 after a rotation relative to the first hinge axis.
Figure 8:
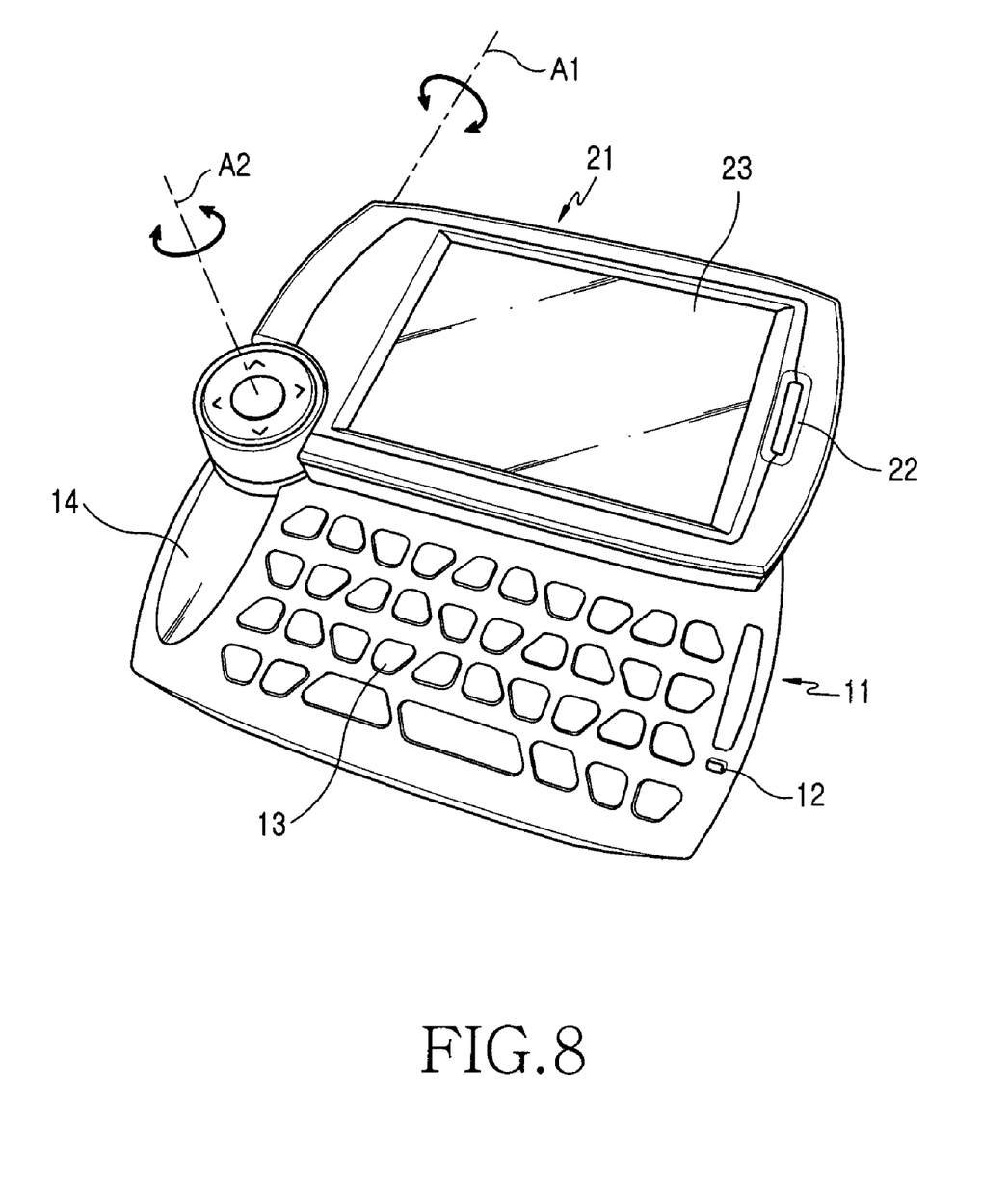
FIG. 8 is a perspective view showing the second housing of the portable terminal in FIG. 5 fully rotated relative to a second hinge axis of the dual axis hinge apparatus in FIG. 1 after a rotation relative to the first hinge axis.

FIG. 7 illustrates a situation where the second housing 21 rotates relative to the second hinge axis A2 after having rotated relative to the first hinge axis A1 by 180 degrees, and FIG. 8 illustrates a state where the second housing 21 has fully rotated relative to the second hinge axis A2. As shown in FIG. 8, if the second housing 21 successively rotates, starting from a state in which it faces the first housing 11, with respect to the first and second hinge axes A1, A2, it comes to be positioned laterally side by side with the first housing 11.

Figure 6:
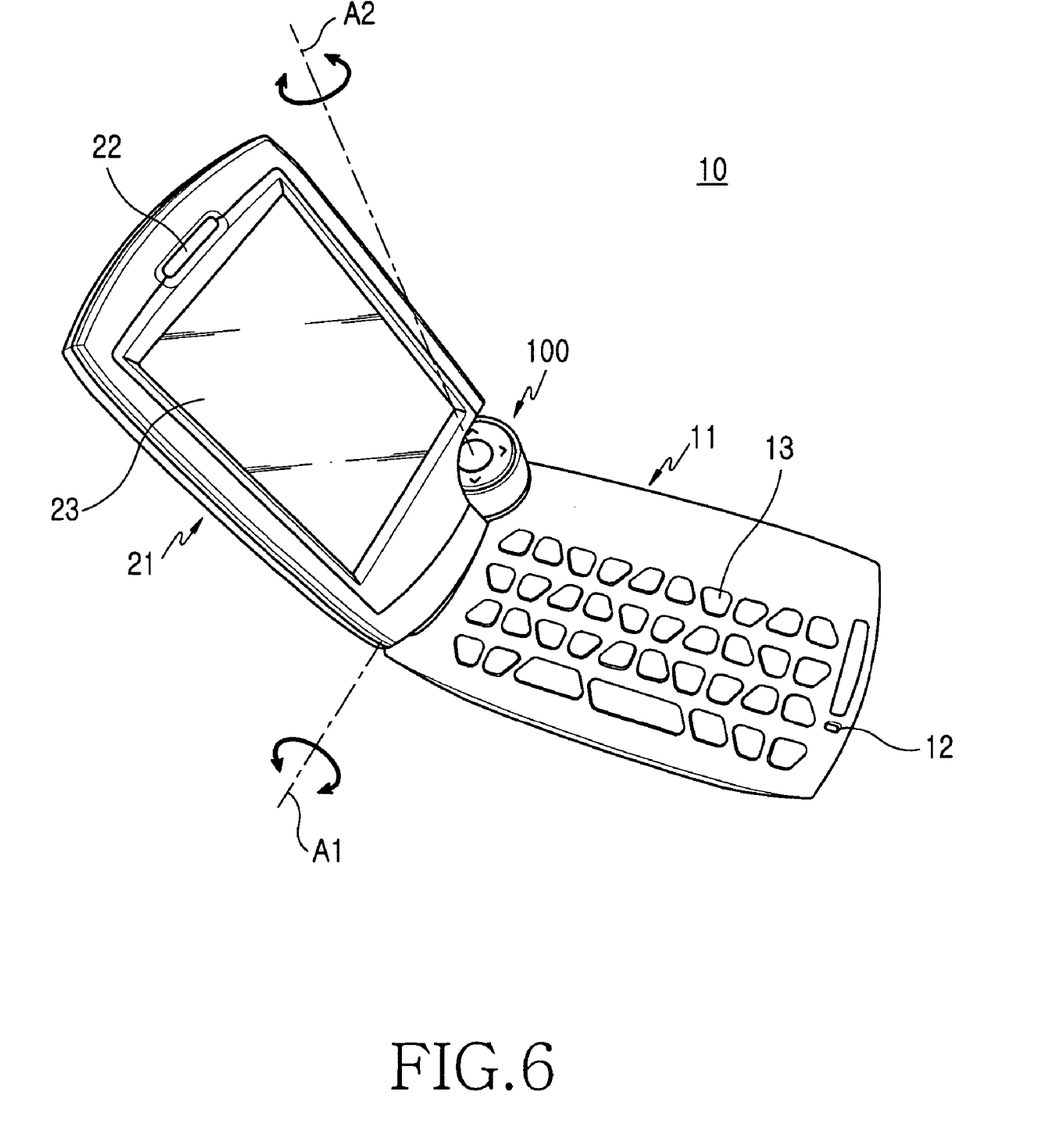
FIG. 6 is a perspective view showing the second housing of the portable terminal in FIG. 5 rotated relative to a first hinge axis of the dual axis hinge apparatus in FIG. 1.

When a user desires to use the portable terminal 10 for a speech call, short message system (SMS) transmission, etc., he or she can rotate the second housing 21 in a direction away from the first housing 11 as shown in FIG. 6. On the other hand, when the terminal 10 is used for viewing movies or TV, playing games or the like, a user can position the first and second housings 11, 21 laterally side by side with each other. At this time, the main display unit 23 of the terminal 10 lies transversely, so that a use can enjoy widescreen images. In addition to an SMS function, a user can conveniently use functions of various information terminals such as PDAs, HHPs, Palm PCs, and the like by constructing the keypad 13 like a keyboard of an ordinary PC.

Figure 9:
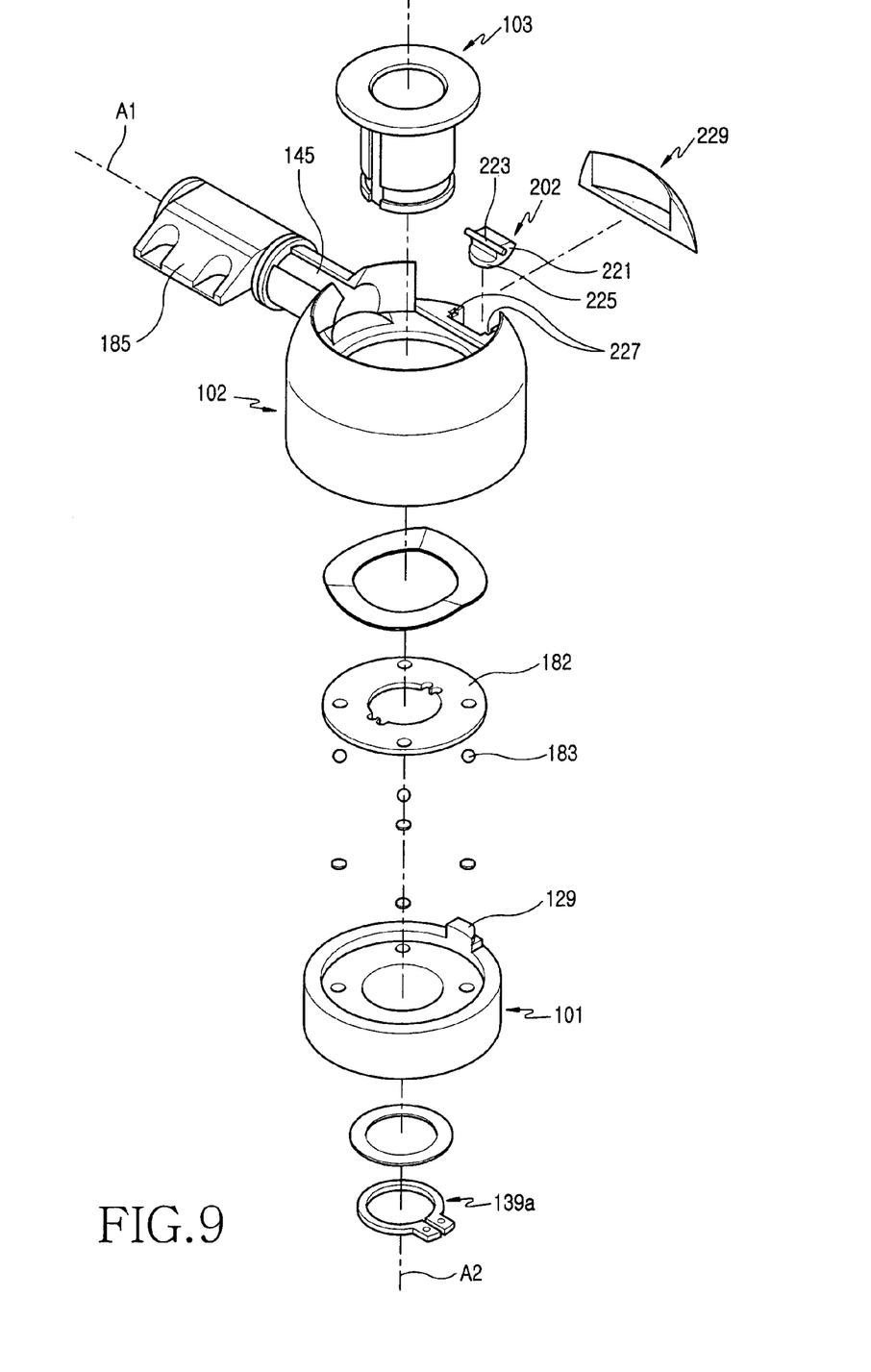
FIG. 9 is an exploded perspective view of a dual axis hinge apparatus for a portable terminal in accordance with another embodiment of the present invention.
Figure 10:
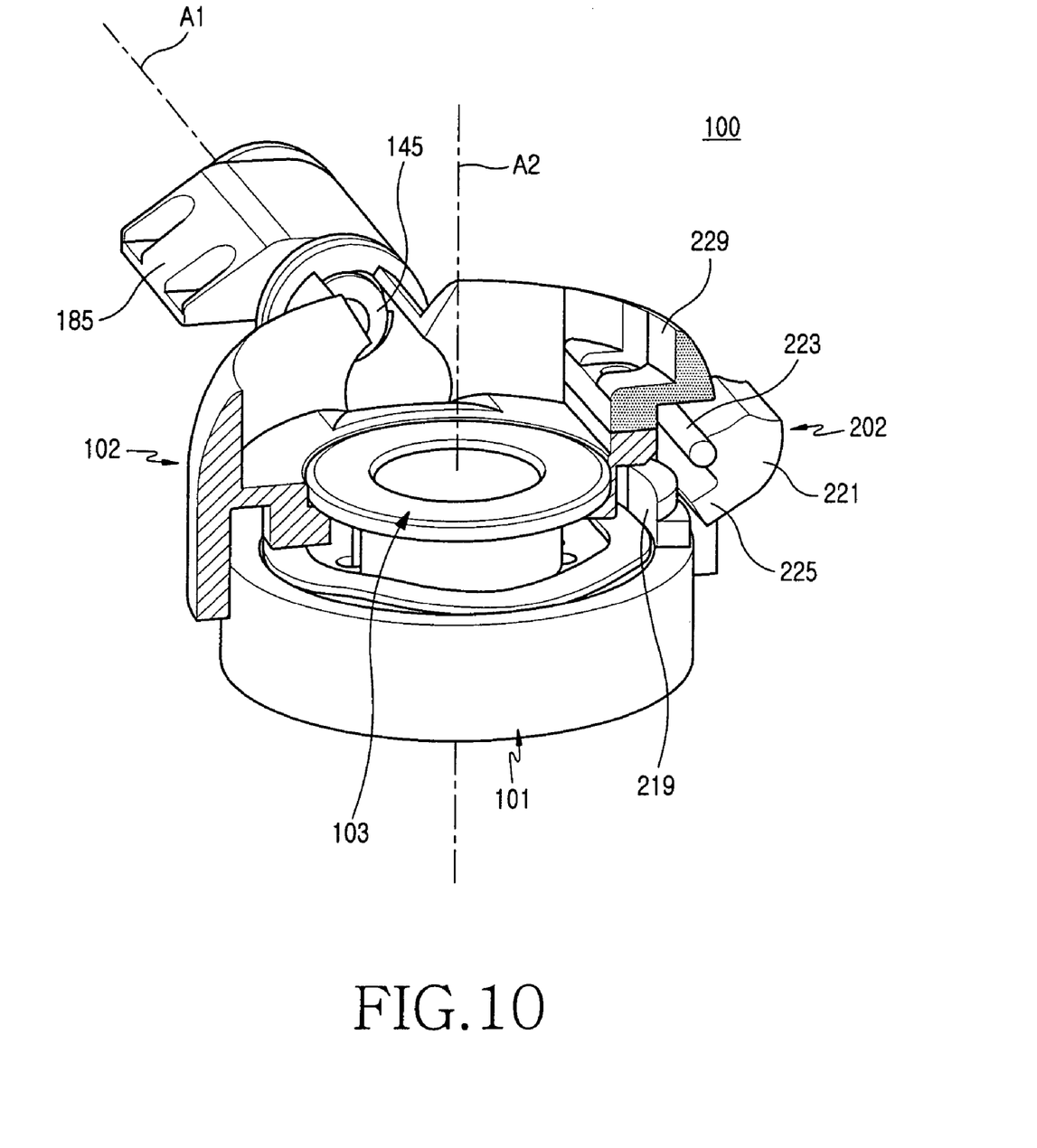
FIG. 10 is a partial cutaway perspective view showing the assembled dual axis hinge apparatus in FIG. 9.

FIGS. 9 and 10 shows a dual axis hinge apparatus 100 for a portable terminal in accordance with another embodiment of the present invention. The dual axis hinge apparatus 100 according to this embodiment is different from the above-mentioned embodiment in that it includes a stopper 202 that restricts the rotation range of the second housing of the terminal. In the following description of the dual axis hinge apparatus 100 according to this embodiment, it is noted that the same reference numerals designate the same parts as those of the previous embodiment. A detailed description of the same parts is not repeated for clarity and conciseness.

As shown in FIGS. 9 and 10, the dual axis hinge apparatus 100 includes a fixed housing 101 and a rotating housing 102 which are coupled to each other by a coupling shaft 103, and has a stopper 202 which protrudes out of and retracts into an outer peripheral surface of the rotating housing 102.

One end of the fixed housing 101 is formed with a driving protrusion 219 protruding in a direction of the second hinge axis A1. If the fixed housing 101 and the rotating housings 102 are coupled to each other, the driving protrusion 219 is located within the rotating housing 102, and swivels along a circumferential direction within the rotating housing 102 as the rotating housing 102 rotates.

The stopper 202 has a pivotal axis 223 formed at one end of its body 221 which protrudes out of and retracts into the outer peripheral surface of the rotating housing 102. The pivotal axis 223 is rotatably coupled on a pivotal groove 227 formed in the rotating housing 102. That is, the body 221 of the stopper 202 protrudes out of and retracts into the outer peripheral surface of the rotating housing 102 as it pivots on the pivotal axis 223. The other end of the body 221 of the stopper 202 is formed with a driven protrusion 225. The driven protrusion 225 is situated within the rotating housing 102, and interferes with the driving protrusion 219 to move the body 221 out of the outer peripheral surface of the rotating housing 102 as the rotating housing 102 rotates.

FIG. 10 illustrates a state where the stopper 202 protrudes out of the outer peripheral surface of the rotating housing 102. As shown in the drawing, when the driving protrusion 219 and the driven protrusion 225 interfere with each other, the stopper 202 is maintained in its protruded state. If the rotating housing 102 rotates so the driving protrusion 219 does not interfere with the driven protrusion 225, the stopper 202 retracts into the rotating housing 102. In other words, when the rotating housing 102 rotates so the driving protrusion 219 does not interfere with the driven protrusion 225, the stopper 202 can rotate freely on the rotating housing 102.

A torsion spring (not shown) which includes a coil wound on the pivotal axis 223 and a pair of fixing ends extending from the coil, can be used to maintain the stopper 202 in a retracted state when the driving protrusion 219 and the driven protrusion 225 are not interfered with each other. That is, by supporting one of the pair of fixing ends on the rotating housing 102 and supporting the other on the stopper 202, it is possible to apply a resilient force acting in a direction in which the stopper 202 retracts into the rotating housing 102. Those skilled in the art can easily understand the construction and function of such a torsion spring, so further details are omitted for conciseness.

When using the torsion spring, the stopper 202 is retracted into the rotating housing 102 when the driving protrusion 219 and the driven protrusion 225 do not interfere with each other.

Figure 11:
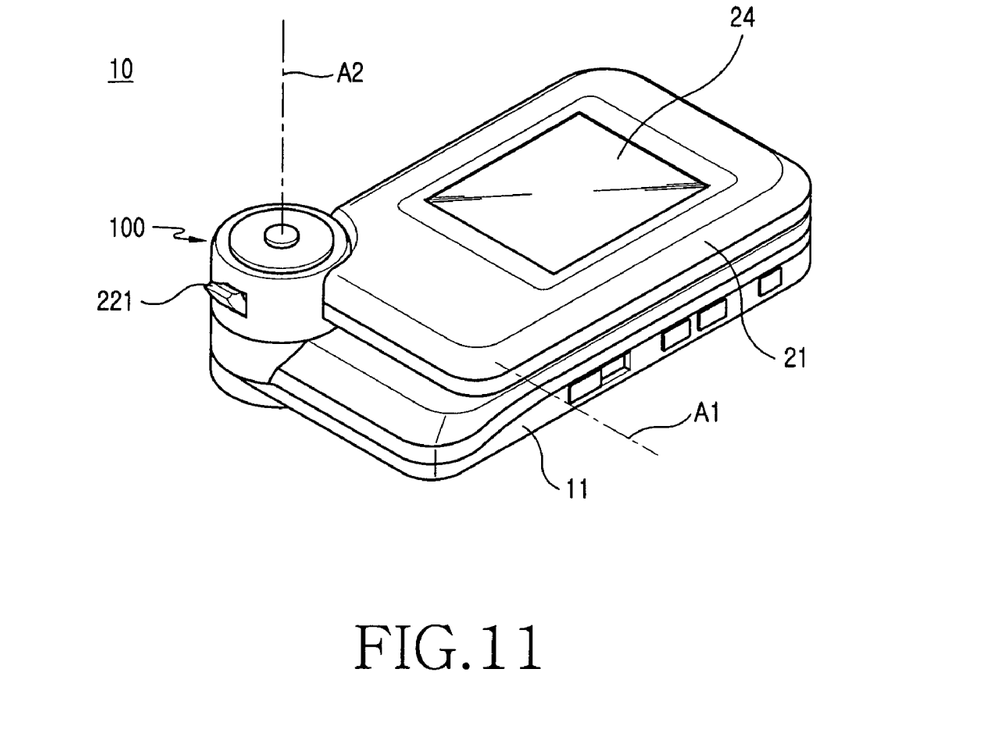
FIG. 11 is a perspective view of a portable terminal with the dual axis hinge apparatus in FIG. 9.

Referring to FIG. 11, when the second housing 21 is folded to face the first housing 11, the stopper 202, in particular, the body 221 protrudes out of the outer peripheral surface of the rotating housing 102. Further referring to FIG. 12, when the second housing 21 pivots relative to the first hinge axis A1 from the folded state, the second housing 21 interferes with the body 221, so that its rotation range is restricted below 180 degrees. In view of the opening and closing actions of an ordinary folder-type terminal, the rotation range of second housing 21 may be restricted to about 150 to 160 degrees.

Figure 12:
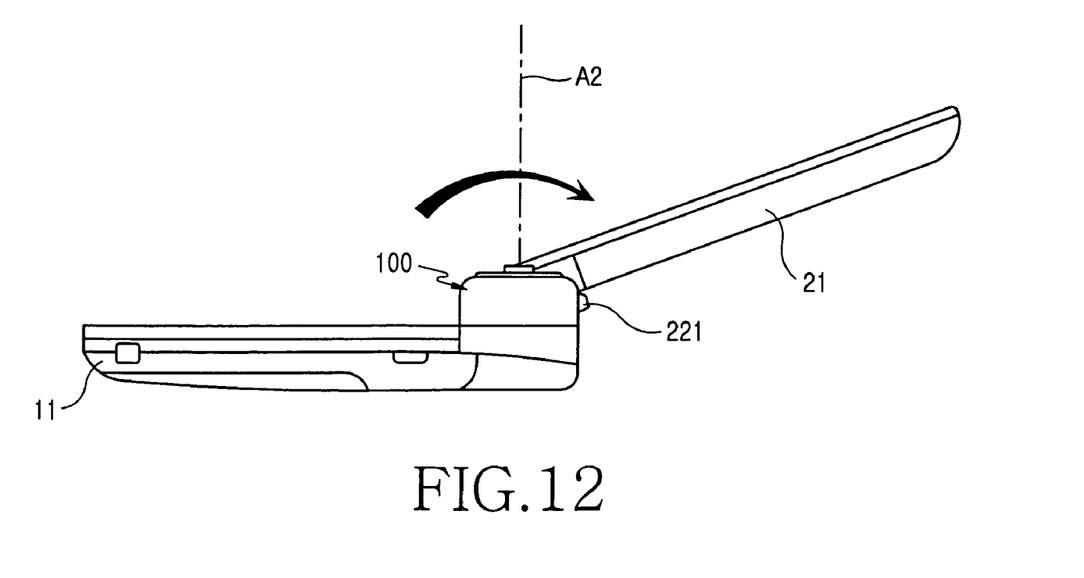
FIG. 12 is a perspective view showing the second housing of the portable terminal in FIG. 11 rotated relative to a first hinge axis of the dual axis hinge apparatus in FIG. 9.

When the rotating housing 102 rotates and is brought into a position where the second housing cannot be folded to face the first housing 11 even if it rotates relative to the first hinge axis 101, the driving protrusion 219 deviates from the driven protrusion. Thus, the stopper 202 is placed into a state where it can retract into the rotating housing 102. At this time, the second housing 21 further rotates relative to the first hinge axis A1 to be located parallel to the plane of the first housing 11.

Figure 13:
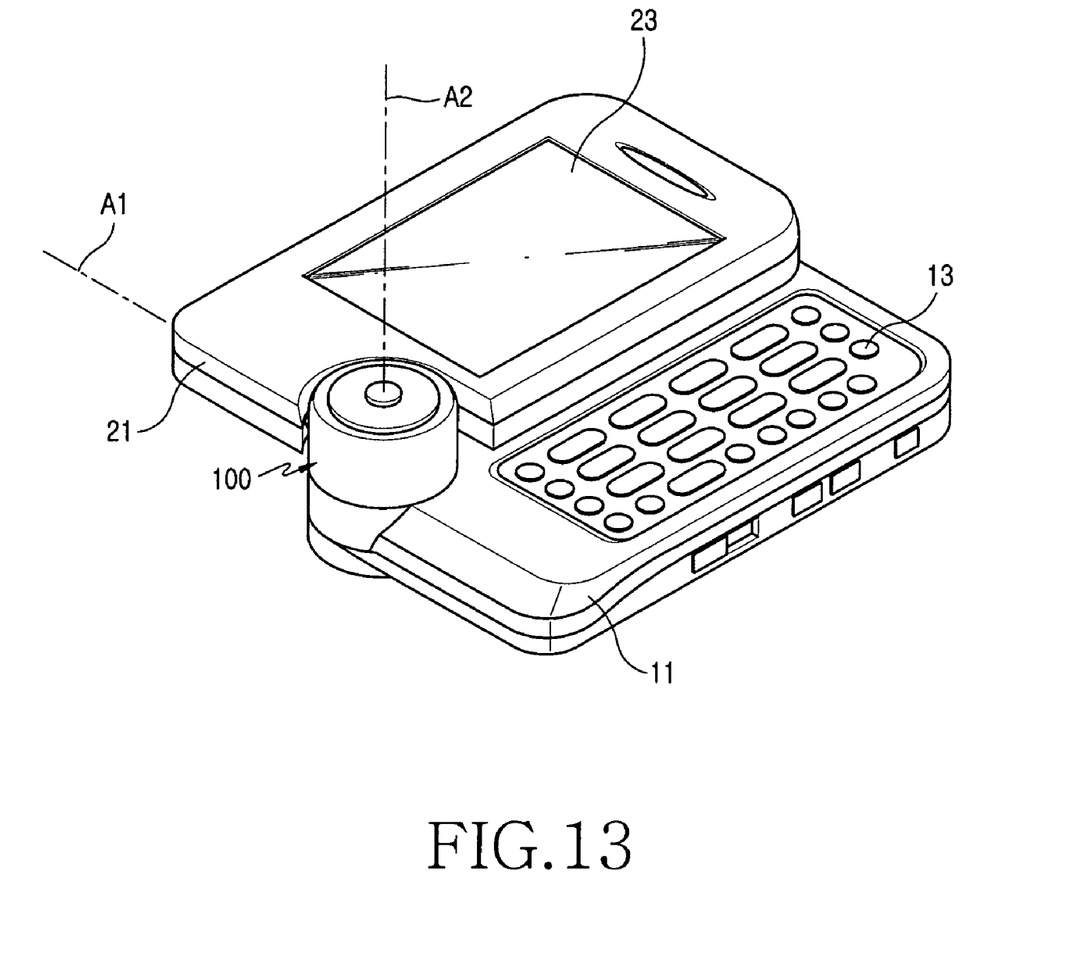
FIG. 13 is a perspective view showing the second housing of the portable terminal in FIG. 11 rotated relative to a second hinge axis of the dual axis hinge apparatus in FIG. 9.

As the second housing 21 is located parallel to the plane of the first housing 11, the second housing 21 is positioned laterally side by side with the first housing 11 if the rotating housing 102 further rotates relative to the second hinge axis A2.

As described above, the dual axis hinge apparatus according to the present invention couples the pair of housings to each other such that they can rotate, from a state where they face each other, in a direction toward or away from each other and simultaneously can also rotate while facing each other, thereby making it possible to position the pair of housings laterally side by side with each other. Accordingly, a display unit can lie transversely and lengthwise, which is convenient for using multimedia services. Moreover, since the pair of housings can rotate in a direction away from each other as in an ordinary folder-type terminal and simultaneously can rotate while facing each other, its opening and closing actions can be diversified so that it is easy to construct various types of information terminals. Furthermore, by restricting an opening angle of the pair of housings to a certain range during the opening and closing actions, the terminal can encompass the contours of a user's face to be comfortable during a call.

While the invention has been shown and described with reference to certain embodiments thereof, it will be understood by those skilled in the art that various changes in form and details may be made therein without departing from the spirit and scope of the invention as defined by the appended claims.

What is claimed is:

1. A dual hinge apparatus for a portable terminal, which provides a first hinge axis and a second hinge axis extending substantially perpendicularly to the first hinge axis, and connects first and second housings constituting the portable terminal to each other such that they can rotate relative to the first and second hinge axes, respectively, the hinge apparatus comprising:

a fixed housing fixed to one of the first and second housings;

a rotating housing rotatably coupled to the fixed housing to rotate relative to the second hinge axis;

a hinge housing coupled to a side surface of the rotating housing to provide the first hinge axis; and wherein the remaining one of the first and second housings is coupled to the hinge housing to rotate relative to the first hinge axis so that the remaining one of the first and second housings rotates with respect to the first and second axes to move between a first position in which the remaining one of the first and second housings faces the one of the first and second housings, and a second position in which the remaining one of the first and second housings is positioned laterally side by side with the one of the first and second housings.

2. The dual axis hinge apparatus as claimed in claim 1, wherein the fixed housing is integral with the first housing of the portable terminal.

3. The dual axis hinge apparatus as claimed in claim 1, further comprising:

a coupling shaft with a supporting plate supported on a first surface of the rotating housing and a coupling cylinder that extends in a direction of the second hinge axis and passes through the fixed and rotating housings, the coupling cylinder having a locking groove on an outer peripheral surface of its end;

a C-ring engaged with the locking groove of the coupling shaft and supported on a second surface of the fixed housing.

4. The dual axis hinge apparatus as claimed in claim 3, wherein the supporting plate is formed integrally with the coupling shaft.

5. The dual axis hinge apparatus as claimed in claim 3, further comprising:

a plate spring interposed between the supporting plate and the rotating housing for biasing the supporting plate away from the rotating housing.

6. The dual axis hinge apparatus as claimed in claim 1, further comprising:

a ball assembly interposed between the fixed housing and the rotating housing.

7. The dual axis hinge apparatus as claimed in claim 6, wherein the ball assembly comprises:

a washer plate interposed between the fixed and rotating housings; and a plurality of balls arranged at equal circumferential distances along a circumferential direction of the washer plate.

8. The dual axis hinge apparatus as claimed in claim 7, further comprising:

a plurality of stopper holes formed in the fixed and rotating housings along the moving path of the balls and engaged with the balls.

9. The dual axis hinge apparatus as claimed in claim 1, further comprising:

a camera element provided within the fixed housing.

10. The dual axis hinge apparatus as claimed in claim 1, further comprising:

a locking piece rotatably coupled to an outer peripheral surface of the hinge housing and fixed to the second housing of the terminal.

11. The dual axis hinge apparatus as claimed in claim 10, wherein the locking piece comprises:

a pair of opposite halves coupled to each other and surrounding the outer peripheral surface of the hinge housing.

12. The dual axis hinge apparatus as claimed in claim 10, further comprising:

a friction piece interposed between the locking piece and the outer peripheral surface of the hinge housing to facilitate rotation of the locking piece.

13. The dual axis hinge apparatus as claimed in claim 1, wherein the hinge housing further comprises:

a hinge hole extending from one end in a direction of the first hinge axis over a certain length.

14. The dual axis hinge apparatus as claimed in claim 13, further comprising:

a hinge shaft rotatably received in the hinge hole, the hinge shaft extending in the direction of the first hinge axis and being fixed to the second housing of the terminal.

15. The dual axis hinge apparatus as claimed in claim 14, further comprising:

a first hinge cam fixed on the hinge shaft, a second hinge coupled to the hinge shaft, the second hinge facing the first hinge cam and being linearly movably on the hinge shaft, and a coil spring for applying a resilient force to bias the first and second hinge cams into contact with each other.

16. The dual axis hinge apparatus as claimed in claim 15, further comprising:

at least one guide protrusion formed on an outer peripheral surface of the second hinge cam; and a guide hole longitudinally extending in a sidewall of the hinge housing and engaged with the guide protrusion, thereby guiding the linear movement of the second hinge cam.

17. The dual axis hinge apparatus as claimed in claim 15, further comprising:

a washer and an O-ring coupled to the end of hinge shaft, wherein the coil spring is supported against the washer and the washer is interposed between the O-ring and the coil spring.

18. The dual axis hinge apparatus as claimed in claim 15, wherein one surface of the first hinge cam is formed with ridge-shaped portions and one surface of the second hinge cam is formed with valley-shaped portions which are selectively engaged with the ridge-shaped portions as the hinge shaft rotates.

19. The dual axis hinge apparatus as claimed in claim 1, wherein the first hinge axis is positioned so that the second housing moves away from or moves adjacent to a position in which it faces the first housing as the second housing rotates around the first hinge axis.

20. The dual axis hinge apparatus as claimed in claim 1, wherein the second housing rotates around the second hinge axis while being maintained in a state where it faces the first housing.

21. The dual axis hinge apparatus as claimed in claim 1, wherein the second housing rotates relative to the first hinge axis in a direction away from the first housing and then rotates relative to the second hinge axis by 180 degrees so that the second housing is positioned laterally side by side with the first housing.

22. The dual axis hinge apparatus as claimed in claim 1, wherein the second housing rotates, starting from a state where it faces the first housing, relative to the second hinge axis by 180 degrees and then rotates relative to the first hinge axis, with the result that the second housing is positioned laterally side by side with the first housing.

23. The dual axis hinge apparatus as claimed in claim 1, further comprising:

a through hole passing from the fixed housing to the rotating housing, a coupling shaft coupled to the fixed and rotating housings through the through hole and formed with a further through hole extending in the direction of the second hinge axis; and an opening formed on one side of the hinge shaft, wherein a flexible printed circuit extends from the fixed housing into the rotating housing through the through hole of the coupling shaft, is bent within the rotating housing, and is withdrawn through the opening of the hinge housing.

24. The dual axis hinge apparatus as claimed in claim 1, wherein the dual axis hinge apparatus is disposed on one side of one end of the terminal.

25. The dual axis hinge apparatus as claimed in claim 1, wherein the rotating housing rotates relative to the second hinge axis within an angular range of 180 degrees.

26. The dual axis hinge apparatus as claimed in claim 1, further comprising:

a driving protrusion protruding from one end of the fixed housing and located within the rotating housing, and a stopper pivotally coupled on the rotating housing to protrude out of and retract into an outer peripheral surface of the rotating housing, wherein the driving protrusion interferes with the stopper as the rotating housing rotates, so that the stopper selectively protrudes out of the outer peripheral surface of the rotating housing.

27. The dual axis hinge apparatus as claimed in claim 26, wherein the stopper protrudes out of the outer peripheral surface of the rotating housing in a state where the second housing is folded to face the first housing, so that it interferes with the second housing to restrict a rotation range of the second housing below 180 degrees when the second housing rotates relative to the first hinge axis from its folded state.

28. The dual axis hinge apparatus as claimed in claim 26, wherein the stopper comprises:

a body protruding out of and retracting into the outer peripheral surface of the rotating housing;

a pivotal axis formed at one end of the body and rotatably coupled on the rotating housing; and a driven protrusion formed at the other end of the body to selectively interfere with the driving protrusion.

29. The dual axis hinge apparatus as claimed in claim 26, wherein the stopper retracts into the rotating housing when the rotating housing rotates into a position where the second housing cannot be folded to face the first housing, even if it rotates relative to the first hinge axis.

30. The dual axis hinge apparatus as claimed in claim 26, wherein the driving protrusion swivels along a circumferential direction within the rotating housing as the rotating housing rotates relative to the second hinge axis.

* * * * *